United States Patent [19]

Lambert

[11] 4,031,976

[45] June 28, 1977

[54] CONSTRUCTION VEHICLE HAVING RETRACTABLE WHEELS FOR TOWING

[75] Inventor: Bernard Lucien Lambert, Montceau-les-Mines, France

[73] Assignee: Potain Poclain Materiel (P.P.M.), Montceau-les-Mines, France

[22] Filed: Oct. 7, 1975

[21] Appl. No.: 620,466

[30] Foreign Application Priority Data

Oct. 9, 1974 France ................ 74.33991

[52] U.S. Cl. ................ 180/14 R; 180/24.02; 212/141; 280/415 B
[51] Int. Cl.[2] ................ B62D 61/12; B62D 53/00
[58] Field of Search ........ 180/14 R, 22, 23, 24.02, 180/24.01, 12, 11; 280/402, 415 B, 415 R; 212/55, 13, 140, 141

[56] References Cited

UNITED STATES PATENTS

| 2,721,405 | 10/1955 | Gardner | 180/24.02 X |
|---|---|---|---|
| 2,966,223 | 12/1960 | Gleasman | 180/23 |
| 2,997,121 | 8/1961 | Clifton | 180/12 |
| 3,101,854 | 8/1963 | Kampert | 280/402 |
| 3,184,076 | 5/1965 | Brown et al. | 180/24.02 |
| 3,336,041 | 8/1967 | Bouley | 280/415 B |
| 3,339,658 | 9/1967 | Peterson | 180/14 R |
| 3,680,720 | 8/1972 | Strange | 280/415 B |
| 3,854,542 | 12/1974 | Jesswein | 180/12 |

*Primary Examiner*—Kenneth H. Betts
*Attorney, Agent, or Firm*—Irvin A. Lavine

[57] ABSTRACT

This invention relates to a self-propelling construction machine comprising a frame provided with at least two groups of ground engaging members disposed and spaced longitudinally on said frame, either the front or rear end of the frame being provided with means for coupling to a tractor or articulated vehicle. The group of ground engaging members disposed near the end with the coupling means comprises a device for adjusting their height with respect to the frame, enabling them to retract away from the ground when said machine is coupled to the tractor, whereas the ground engaging members other than those disposed near the end with the coupling means are constituted by a wheel assembly which is irremovable whilst the machine is functioning. One application of the present invention is the production of a travelling crane.

4 Claims, 4 Drawing Figures

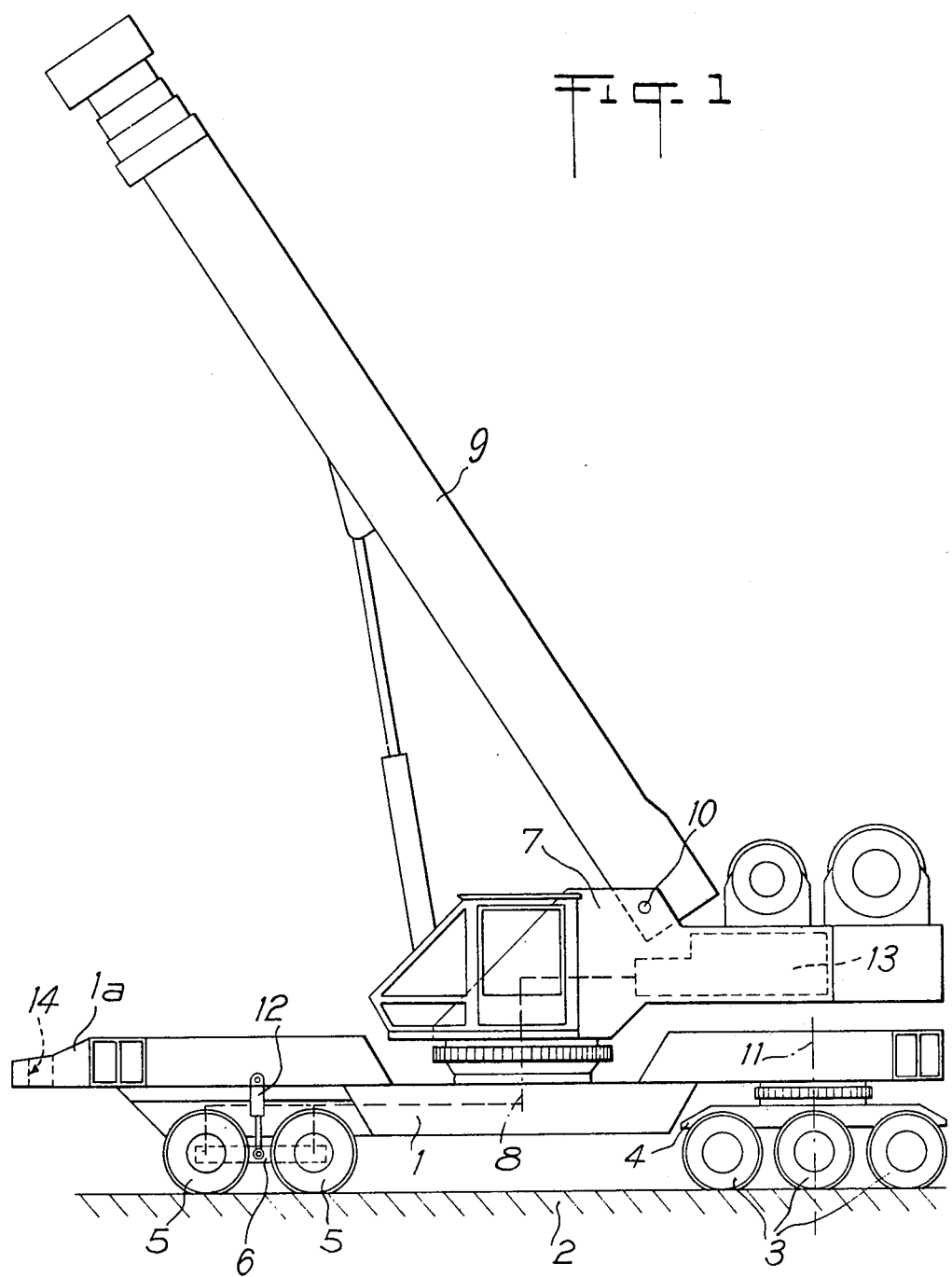

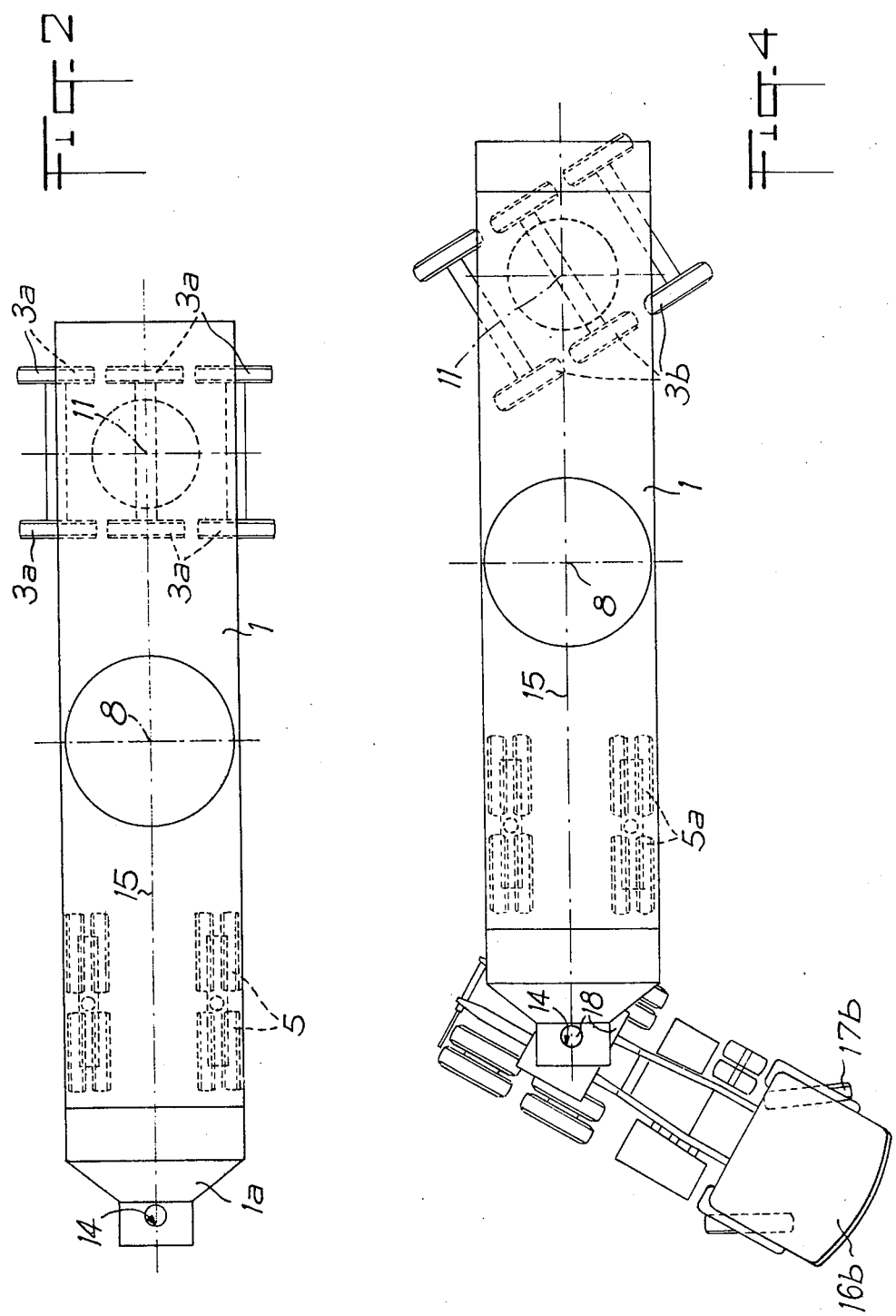

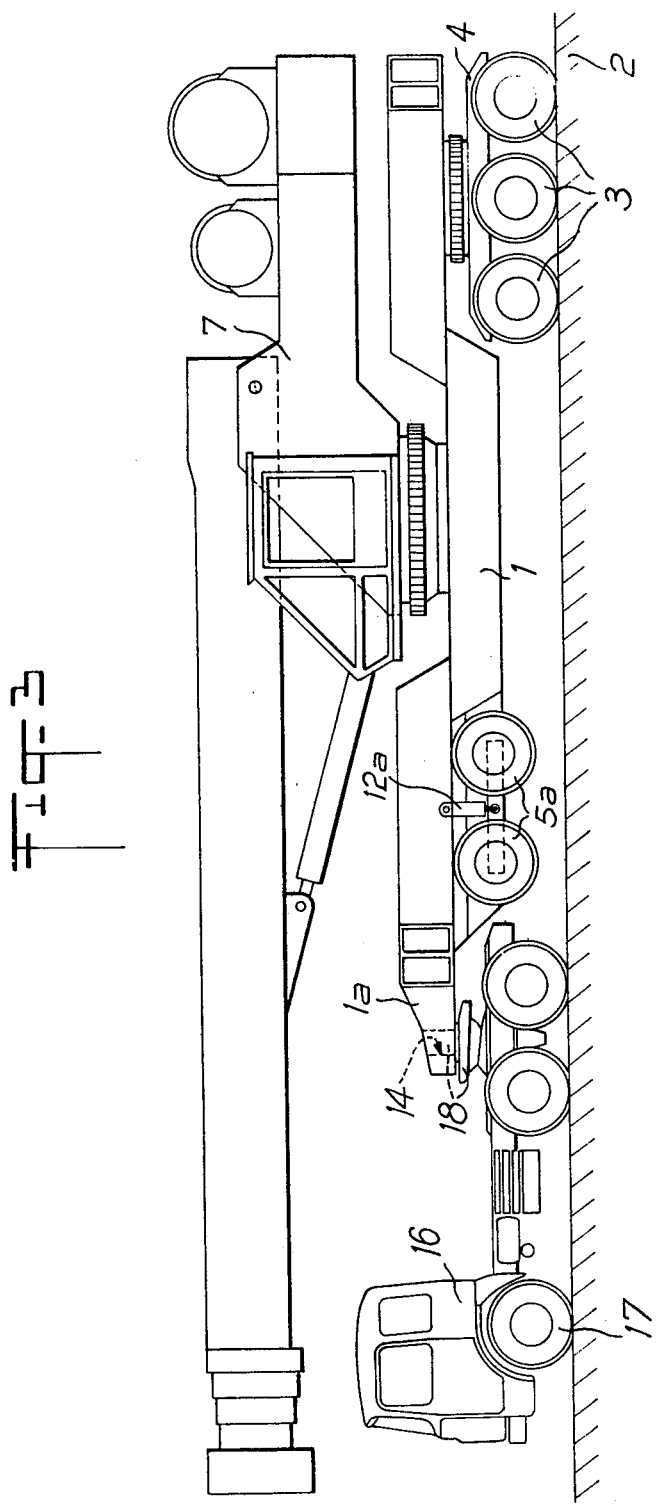

CONSTRUCTION VEHICLE HAVING RETRACTABLE WHEELS FOR TOWING

The present invention relates to a self-propelling construction machine having a particular supporting frame.

The present tendency is to reduce the duration of the periods of non-functioning of the working equipment of construction machines, such as travelling cranes, this non-functioning being due to the relocation of the machine between the various sites.

It has been ascertained that the increase on the one hand in the desired maximum speeds on the highway and on the other hand in the weight of the mobile machines, has made it necessary to install considerable power, of the same order as the power of heavy trucks.

When, to comply with this requirement, a crane is mounted on a truck, the power of said truck is poorly used on the site, in that the power necessary for the functioning of the working equipment and for displacement on the site is considerably lower than that necessary for movement on the highway.

In addition, the handling ability of a truck on the site is not as good as that obtained by a specialised machine which locks well.

It is an object of the invention to remedy the above-mentioned drawbacks and, to this end, it relates to a self-propelling public works machine comprising a frame provided with at least two groups of displacement members disposed and spaced longitudinally on said frame, either the front or rear end of the frame being provided with a means for coupling to a tractor or articulated vehicle.

In this machine, the group of ground engaging members disposed near said end provided with the coupling means comprises a device for adjusting their height with respect to the frame, enabling them to retract away from the ground when said machine is coupled to the tractor, whereas the displacement members, other than those disposed near the end with the coupling means, are constituted by a wheel assembly which is irremovable whilst the machine is functioning.

The following dispositions are preferably adpoted:
the displacement members, other than those disposed near the coupling means, constitute steering members for this machine and are mounted on an auxiliary frame mounted to rotate with respect to the frame of the machine;
the coupling device is of the "semi-trailer" type.

The invention will be more readily understood on reading the following description given with reference to the accompanying drawings, in which:

FIG. 1 is a view in elevation of a travelling crane according to the invention, in the configuration adopted on the site;

FIG. 2 is a plan view of the crane of FIG. 1, ready to pivot, the turret not having been shown in order to render the drawing clearer;

FIG. 3 is an elevation of the crane of FIG. 1, but in its configuration for displacement on the highway;

FIG. 4 is a plan view of the crane of FIG. 3.

Referring now to the drawings, FIG. 1 shows a self-propelling crane which comprises:

a main frame 1 which is supported on the ground 2 via a first wheel assembly 3 mounted on an auxiliary frame 4, and a second wheel assembly 5 mounted on a bearing arm 6, a turret 7 mounted to pivot on the main frame 1 about a vertical axis 8;

and a boom 9 articulated on the turret 7 about an axis 10.

The auxiliarly frame 4 is mounted to pivot on the main frame 1 about a vertical axis 11 so that the wheels 33 are orientable and are, for this reason, called "steering wheels" of the machine.

The bearing arm 6 slides vertically on the main frame 1 and its position with respect to this frame 1 is adjustable by means of a jack 12. Moreover, it must be noted that the wheels 5 are drive wheels and are coupled for example to a hydraulic drive motor supplied with pressurised hydraulic fluid from station 13 mounted in the turret 7. Station 13, as is conventional, is the location of an internal combustion engine and a pump driven by it, the dashed lines on FIG. 1 generally representing hydraulic lines extending between the pump and drive motor(s) for the wheels 5.

Finally, the end 1a of the main frame 1 adjacent wheels 5 is provided with a means 14 for coupling to an articulated lorry.

FIG. 2 shows the crane of FIG. 1, but with the steering wheels oriented at 3a perpendicularly to the longitudinal axis 15 of the main frame 1.

FIG. 3 shows the same machine as shown in FIG. 1 but this time coupled to a tractor 16 with steering wheels 17. The coupling member 14 cooperates with the coupling device 18 of the lorry 16 so that the main frame 1 is effectively towed by this tractor. The jack for adjusting the position of the drive wheels of frame 1 has retracted to 12a, thus lifting said wheels to 5a, into a position in which they no longer touch the ground 2.

Finally, FIG. 4 shows the machine of FIG. 3, but in a slightly modified configuration, in which the tractor is now at 16b, its steering wheels oriented at 17b and the steering wheels of the main frame 1 oriented at 3b, obliquely with respect to the longitudinal axis 15.

The advantages of use of the machine which has just been described will now be set forth.

Firstly, the machine moving in the site (FIGS. 1 and 2) may move at relatively low speed, by means of its own propulsion members 5 and steering members 3 (or 3a). The station 13 is well adapted to working on the site and, in this configuration, the machine is not distinguishable from the other conventional site machines. However, its ability to lock is to be noted, the steering wheels being orientable between their positions 3 and 3a.

On the contrary, when moving on the highway between sites, (FIGS. 3 and 4), the machine shown is very superior to its prior known homologues.

In fact, it may be towed like any highway trailer by a tractor 16 provided with a coupling device 18 of the semitrailer type. Its wheels 5a are then retracted with respect to the ground 2, and its maximum speed of movement is the one allowed by the power of the tractor 16, about 4 or 5 times its maximum speed of movement on the site.

The tractor 16 is in fact constituted by an ordinary standard articulated tractor.

The lock of the wheels 3b combined with that of wheels 17b, makes it possible to obtain a satisfactory handling ability of the tractor 16b and main frame 1.

The tractor 16 is employed only during road movement, and is free for further towage as soon as the crane is at the site (FIGS. 1 and 2). The profitability of the whole is thus satisfactory.

As a variant, the wheels 3 (3a or 3b) may also be drive wheels.

The machine is simple to produce, this simplicity being associated with the fact that the auxiliary frame 4 is irremovable when the machine is functioning and is permanently coupled to the main frame 1. In particular, no dismantling device need be provided and the wheels 3 are used both on the highway and on the site.

What is claimed is:

1. A self-propelling construction machine comprising a frame provided with at least two groups of ground engaging members disposed and spaced longitudinally on said frame, one end of the frame being provided with a means for coupling to a towing vehicle, wherein the first group of ground engaging members is disposed near said end provided with the coupling means, said first group comprising means for elevating the ground engaging members with respect to the frame to a position above the ground, and the second group of displacement members being at a constant height relative to the frame and enabling movement of the machine when it is coupled to the towing vehicle, a prime mover on said machine, said first group of ground engaging members comprising drive members, means for transmitting power from said prime mover to said drive members, and said second group of members being mounted for steering movement, whereby said machine may be self-propelled and steered at a construction site, and whereby the machine may be coupled to a towing vehicle and transported over highways with the first group retracted.

2. A machine as claimed in claim 1, wherein the second group of members are the steering members of the machine when it moves by its own power.

3. A machine as claimed in claim 2, wherein the second group of members is disposed on an auxiliary frame mounted to rotate with respect to the frame of the machine.

4. A machine as claimed in claim 1, wherein the coupling means is of the semi-trailer type.

* * * * *